ём

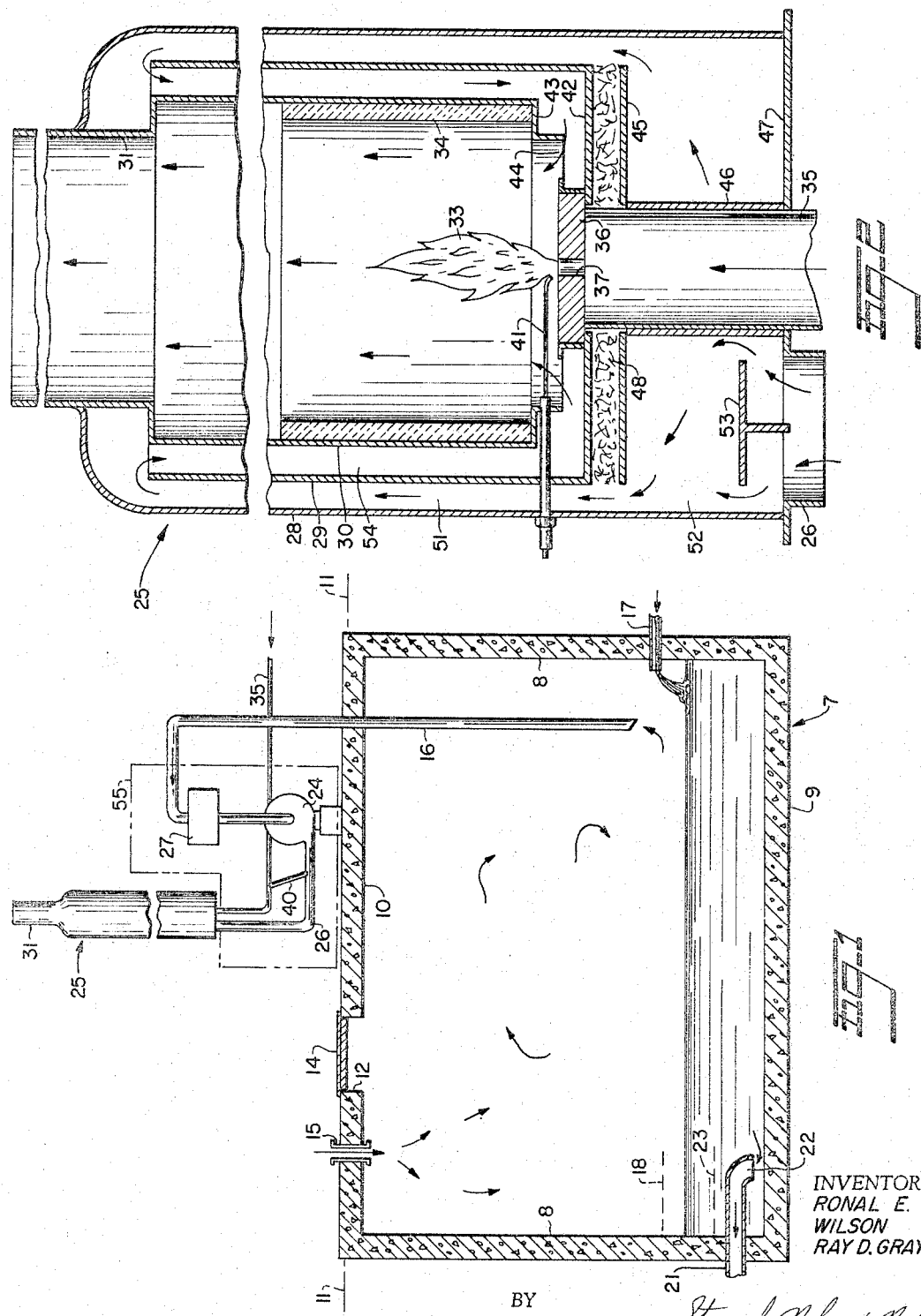

United States Patent Office 3,337,455
Patented Aug. 22, 1967

3,337,455
SEWAGE LIFT STATION AND METHOD OF
OPERATING THE SAME
Ronal E. Wilson, 1209 Shady Grove Drive, and Ray D.
Gray, 2303 Bell Grove Drive, both of Bossier City, La.
71010
Filed Mar. 29, 1965, Ser. No. 443,595
12 Claims. (Cl. 210—63)

This invention relates to sewage lift stations and to a method and apparatus for deodorizing noxious gases that are vented therefrom.

Sanitary sewers require a slope so that the force of gravity will cause the sewage to flow to a treatment plant or other disposal system. In areas where the surface of the ground is substantially flat, a sewer line that starts only two feet below the surface may be fifteen to twenty feet deep within a distance of two miles and addiitonal sewage will normally be entering the line at many points along the route. The sewage may be required to travel much farther than two miles in order to reach its point of disposal. However, installation of a sewer line at greater depths is not economically feasible and some method to raise the sewer line to a higher level is needed so that it may be extended another two miles before reaching an uneconomic depth, and so on until it reaches its point of disposal.

A sewage lift station serves the purpose of raising the sewage to a higher level so that it may be discharged into the entrance of a sewer line at a higher level. Such a station comprises a covered tank, usually of concrete, buried in the ground sufficiently deep so that it will receive sewage from the discharge end of a sewer line. A pump that is activated automatically when the sewage in the tank reaches a predetermined maximum level is used to pump sewage from near the bottom of the tank to the desired height where it will enter another sewer line at a higher level. When the sewage level in the tank has been lowered sufficiently the aforesaid pump is automatically stopped, thus allowing the sewage level in the tank of the lift station to rise again until the pump is again turned on automatically.

In order to prevent changes in pressure in the gas in the lift station tank as the sewage level therein rises and falls, such tanks must be vented to the atmosphere. However, there are other problems which are not solved by the mere venting of the tank to the atmosphere. The space in the tank above the sewage level is filled with odorous gases. While the contents of these odorous gases vary, as do the percentages of the gases in the mixtures, they generally include carbon dioxide, methane and hydrogen sulfide. The carbon dioxide, in weak concentrations is odorless and harmless. The methane is odorous and inflammable, and being lightest in weight, tends to collect in the top of the tank. Hydrogen sulfide gas ($H_2S$) is odorous and poisonous as well as inflammable and being heavy it tends to collect in the lower portion of the tank just above the surface of the sewage therein. It has a density of approximately 1.189 with respect to air at 1.00. While these gases do not actually stratify at different levels, there is more hydrogen sulfide adjacent the surface of the sewage and more methane in the top of the tank. The hydrogen sufide is not only odorous, even in weak concentrations, but is also poisonous and there have been instances where men have died from inhaling this gas while repairing the automatic sewage level control in sewage lift stations. Thus these gases should not be vented to the atmosphere without suitable treatment to either oxidize or decompose them to render them harmless.

A problem related to the presence of hydrogen sulfide gas results from the fact that the humidity in the tank of a lift station tank is normally very high and there is considerable condensation of water on the cool concrete walls of the tank above the fluid level. This condensed water absorbs the hydrogen sulfide to form hydrosulphuric acid, one volume of water absorbing approximately three volumes of the gas. This acid attacks the concrete of the tank, causing disintegration thereof, to the point where the tank may fail structurally, and many concrete tank lift stations have collapsed for this reason.

In accordance with the invention the gases above the sewage level in the lift station tank are continuously withdrawn from the tank from a low point, about 12 to 18 inches above the highest sewage level. These gases are subsequently raised to a high temperature so that they are oxidized or decomposed and lose their inflammable and odorous characteristics before being discharged to the atmosphere. The rate of withdrawal is sufficiently high that atmospheric air will continuously be admitted to the tank through a vent, whether the level of the sewage in the tank is rising or falling, and the fresh air inlet vent is of a small enough size that the air enters the lift tank at a high velocity, creating a turbulent downward stream of fresh air that causes mixing of the gases already in the tank. This entering fresh air also reduces the relative humidity inside the tank, thus reducing moisture condensaiton on the walls and the resulting formation of hydrosulphuric acid thereon.

Thus, by the use of the invention, odorous gases are not discharged from the lift station, there is no poison gas or explosion hazard, and tank wall decay is eliminated.

It is accordingly a primary object of the invention to provide a new and improved sewage lift station and gas deodorizer.

Another important object of the invention is the provision of a new method of rendering harmless and odorless the noxious sewer gases collected in sewage handling systems such as sewage lift stations.

It is still another important object of the invention to provide a new and improved method of rendering harmless and disposing of noxious sewer gases.

Other objects will become apparent as the description proceeds in connection with the appended drawings, wherein:

FIGURE 1 is a view, partly in vertical section of a sewage lift station and gas deodorizer embodying the invention.

FIGURE 2 is a view, in vertical section, of an embodiment of a sewage gas deodorizer illustrating the invention.

Referring to FIGURE 1, there is shown in vertical section a concrete tank having side walls 8 which may be of any configuration such as circular or rectangular, a bottom wall 9 and a top wall 10. The upper surface of the top wall 10 is usually flush with or a little above the surface of the ground level indicated at 11. In the top wall is a manhole or opening indicated at 12 large enough for servicing personnel to enter the tank, the opening 12 being normally closed by a removable cover 14. A fresh air inlet is provided by a fitting 15 passing through the top wall, and a sewer gas exhaust pipe 16 also passes through the top wall. The diameter of the vent 15 is much smaller than that of the pipe 16 so that air will enter through the vent at a high velocity, to agitate and mix the sewage gases in the tank. For example, if the inner diameter of pipe 16 is 4 inches the diameter of the vent should be about 1 inch.

Sewage enters the tank through a pipe 17 passing through a side wall at a point above the dotted line 18 which indicates the highest level of sewage in the tank because when the level reaches that point a discharge pump is started automatically by means of float controls or the like, not shown, and the sewage is pumped out of a discharge outlet 21 passing through a wall of the tank and having an inlet 22 adjacent the floor 9 of the tank. The sewage is removed through the outlet 21 at a rate greater than that of its entry through pipe 17, so that the sewage level in the tank falls to its lowest level indicated by dotted line 23, whereupon the sewage discharge pump is automatically stopped by means not shown.

The sewer gas exhaust pipe 16, which is connected to a deodorizer now to be described has its inlet at a point from 12 to 18 inches above the highest sewage level, indicated by the line 18.

The sewer gas is forcefully withdrawn by pipe 16 by means of a blower 24 which connects the pipe 16 to a deodorizer indicated generally at 25 in both figures of the drawings, there being a pipe 26 connecting the discharge side of the blower to the sewage gas inlet of the deodorizer. Although the mixture of sewage gases and air passing through the exhaust pipe 16 normally contains such a low concentration of inflammable methane and hydrogen sulfide that the mixture is not combustible, and no burning thereof takes place in the deodorizer, a flame arrester 27 is placed in the sewer gas exhaust pipe 16 adjacent the entrance to the blower 24 to prevent the possibility of any back fire through the pipe 16 and into the tank 7.

Referring to FIGURE 2, deodorizer 25 comprises a series of three concentric metal tubes, an outer tube 28, a middle tube 29 and a central tube 30 which terminates at its upper end in an outlet tube 31 that discharges to atmosphere. The central tube 30 is lined, at least in its lower portion in the region of a flame 33, with a refractory material 34 that protects the metal of the tube 30 from the direct heat of the flame and assists in maintaining the gases within the central tube at a maximum temperature. The flame 33 is fed fuel by a gaseous fuel line 35 that enters the deodorizer centrally of its bottom.

A metallic burner orifice plate 36 closes the discharge end of the fuel line 35 except for a burner orifice 37 through the plate, the flame 33 being above this orifice. Primary combustion air for the burner is taken from the pipe 26 on the discharge side blower by a pipe 40 connecting the pipe 26 and the fuel line 35, the pressure in pipe 26 being greater than that in the fuel line. A spark rod 41 shown in FIGURE 2 extends through the concentric tubes forming the deodorizer and extends to a point adjacent the orifice 37 in the plate 36 where it may form a spark between its tip and the plate 36 in a conventional manner to ignite the gas to form the flame 33. This need be done only when starting the plant in operation, since the plant is intended to operate continuously. Conventional means, not shown, may be used to automatically cut off the supply of gas fuel in the line 35 in the event the burner is extinguished accidentally, as by a down draft in outlet tube 31 resulting from weather conditions or the like.

The burner orifice plate 36 rests centrally upon a circular plate 42 that closes the middle tube 29 at its lower end, the lower end of the central tube 30 terminating in an angular flange 43 that supports the refractory lining 34 and directs the sewage gases passing downwardly between mid tube 29 and central tube 30 to turn inwardly and then upwardly through an annular opening 44 between the angular flange 43 and the periphery of the burner orifice plate 36. The sewage gases then do not pass through the flame 43 but flow upwardly in the central tube 30 between the flame and the refractory 34, where they reach their highest temperature, receiving radiant heat both from the flame and from the refractory.

Below the circular plate 42 is a similar circular plate 45 which is supported by a tube 46 surrounding the fuel line 35 and resting upon a plate 47 that closes the lower end of the deodorizer. Between the plates 42 and 45 is insulation 48 that reduces the rate of heat transfer to the sewage gases entering through pipe 26 and passing thence upward into the annular space 51 between outer tube 28 and mid tube 29. At the point where the pipe 26 discharges into a chamber 52 below the plate 45 is located a baffle 53 that distributes the incoming sewage gas evenly within the chmber and also creates a resistance to the flow of sewage gas in pipe 26 to assure that the pressure in pipe 26 is sufficiently high that it will force sewage gas through the pipe 40 and into the fuel gas line 35 to provide primary air for combustion.

The sewage gases in chamber 52 enter the annular space 51 between the outer tube 28 and the mid tube 29, flowing upwardly therein, and insulating the outer tube 28 from the heat of the mid tube 29, thus maintaining the outer tube 28 substantially at an ambient temperature without the use of insulation while picking up heat from the mid tube 29. The sewage gases then make a 180 degree turn and pass downwardly through an annular space 54 between the mid tube 29 and the hot central tube 30, wherein its temperature is increased substantially. At the bottom of the central tube the flow of sewage gases is reversed through 180 degrees again and they flow upwardly through the annular opening 44 and between the flame 33 and the refractory lined central tube 30. It is during this last passage that the gases reach their highest temperature, and by the time they reach the upper end of the refractory lining 34 the noxious gases will have been oxidized and deodorized. Above the refractory lining the heat of the gases is utilized to heat the upper portion of central tube 30 and thus the sewage gases passing downwardly in the annular space 54.

If desired, the blower, flame arrester, and associated piping may be enclosed in a housing 55 indicated in dot-dash lines in FIGURE 1, and the deodorizer 25 may be supported upon the housing.

The above described deodorizer completely deodorizes the noxious sewage gases by raising them to an oxidizing or decomposition temperature in the presence of sufficient oxygen containing air to support oxidation. Due to the constant admission of air into the lift station tank through the fresh air inlet 15 there is always sufficient air for this purpose in the sewage gas, as well as for supplying primary air combustion for the burner by way of pipe 40. The capacity of the blower 24 is such that air will be continuously vented into the tank 8 even when the sewage level therein is rising from its lowest level at 23 to its highest level at 18. Normally the capacity of the blower will be from 150 to 500 cubic feet per minute, depending upon the demands of the individual lift station.

Temperatures needed to deodorize the sewage gas are variable and depend largely upon the constituents of the sewage gas, which are different for a lift station serving a residential district and one serving an industrial area. It is known that they are deodorized by heating to temperatures of from 500° F. to 2300° F. and a suitable temperature can be determined experimentally at the lift station and the size of the flame adjusted to provide the proper temperature.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a method of operating a sewage lift station that includes a tank and means for raising collected sewage to a higher level, the steps comprising:
  (a) admitting atmospheric air into the top of the tank substantially only adjacent one end thereof at a high velocity in a stream in sufficient quantity to agitate and dilute the sewage gases to form an incombustible mixture in said tank;
  (b) withdrawing the incombustible mixture of air and sewage gases from the tank at a zone adjacent the surface of the sewage in the tank adjacent the opposite end thereof remote from the air inlet stream at a rate sufficiently great to prevent any material quantity of such sewage gases from dissolving in the liquid in said tank to form a corrosive substance; and (c) heating said withdrawn mixture to a temperature in the range of 500° F. to deodorize it by oxidation or decomposition.

2. The method described in claim 1 wherein all three steps are performed simultaneously and continuously.

3. A sewage lift station and gas deodorizer comprising:

(a) a tank having an inlet and an outlet for sewage in the lower part thereof and a space for sewer gas above said sewage inlet;

(b) means forming an air inlet adjacent the top of said tank substantially only at one end thereof to permit dilution of the sewage gases in said tank to an incombustible level;

(c) means adjacent the opposite end of said tank forming a gas exhaust remote from said air inlet and adjacent but above the level of said sewage inlet;

(d) a gas deodorizer having a heating means; and (e) a blower connecting said gas exhaust means to said deodorizer, whereby atmospheric air flow into said chamber through said inlet is induced and intermixed air and sewer gases may be continuously withdrawn from said tank and passed through said deodorizer for deactivation at a rate sufficiently great to prevent any material quantity of sewer gases being dissolved in liquid within said tank to form a corrosive substance.

4. The device described in claim 3 wherein the cross sectional area of the passage through said air inlet means is substantially smaller than the cross sectional of the passage through said gas exhaust means, whereby air enters said tank at a higher velocity than the gas is withdrawn therefrom to thereby produce gas turbulence within said gas and rapid intermixture of air with the gas within said tank.

5. The device described in claim 3 wherein:

(a) said heating means for said deodorizer comprises a gas burner;

(b) means for supplying said burner with a gaseous fuel; and (c) means for mixing exhaust gas from said tank with said gaseous fuel to supply primary combustion air for said burner.

6. A sewage gas deodorizer comprising, a vertical outer tube, a central tube and a mid tube between said central and outer tubes, said central tube being shorter than said mid tube, and said mid tube being shorter than said outer tube, the upper ends of said tubes being substantially coplanar; means forming a first passageway connecting the upper end of the space between said outer and mid tubes and the upper end of the space between said mid tube and said central tube; a closure plate for the bottom end of said mid tube, said closure plate being in spaced relation below the bottom of said central tube and defining a second passageway connecting the lower end of the space between said mid tube and said central tube and the space within said central tube; a closure plate for the bottom end of said outer tube having an entrance port therethrough; a burner orifice plate centrally of said closure plate and projecting upwardly above said closure plate whereby said second passageway is annular; and means for supplying said burner orifice plate with fuel, and means for supplying through said entrance port an incombustible mixture of air and sewer gases for heating as it passes between said tube and oxidation and decomposition in said central tube under the influence of combustion of fuel passing through said burner orifice plate.

7. The deodorizer described in claim 6 wherein the space between said closure plates for the bottom ends of said outer and said mid tubes forms a distributing chamber for sewage gases before they enter the space between said outer and mid tubes; and baffle means adjacent said entrance port to diffuse the entering sewage gases throughout said distributing chamber.

8. The deodorizer described in claim 6 wherein the space between said closure plates for the bottom ends of said outer and mid tubes forms a distributing chamber for sewage gases before they enter the space between said outer and mid tubes; and a layer of insulation on said closure plate for the bottom end of said mid tube, whereby heat transfer to sewage gases in said distributing chamber is minimized.

9. The deodorizer described in claim 6 wherein said central tube has a refractory inner lining for a substantial portion of its length above its bottom end.

10. A method of deodorizing and rendering innocuous sewer gas collecting in a chamber above the surface of sewage maintained within the bottom of a tank comprising the steps of:

(a) introducing atmospheric air into the top of such chamber at a location substantially only adjacent one lateral extremity thereof and at a velocity and in a quantity sufficient to agitate and dilute the sewer gases in the chamber and maintain an incombustible mixture in said chamber;

(b) withdrawing the incombustible mixture of air and sewer gas from the chamber adjacent the opposite lateral extremity thereof and at a level slightly above the surface of the sewage and at a rate sufficiently great to prevent dissolution of any material quantity of the soluble components of such sewer gases in any of the liquid in said tank to form corrosive substances; and (c) heating the withdrawn mixture to a temperature sufficiently high to deodorize the malodorous constituents of the sewer gas by oxidation and decomposition.

11. A sewage lift station and gas deodorizer comprising:

(a) a tank having an inlet and an outlet for sewage in the lower part thereof and a space for sewer gas above said sewage inlet;

(b) means forming an air inlet adjacent the top of said tank;

(c) means forming a gas exhaust adjacent but above the level of said sewage inlet;

(d) a gas deodorizer having a heating means;

(e) a blower connecting said gas exhaust means to said deodorizer, whereby gases may be continuously withdrawn from said tank and passed through said deodorizer;

(f) said deodorizer comprising a metallic outer tube, a metallic central tube, and a metallic mid tube between said outer and central tubes;

(g) means for directing exhausted sewage gases from said tank into the space between said outer and mid tubes, thence into the space between said mid tube and said central tube, and then into said central tube;

(h) a fuel burner adjacent the sewage gas inlet to said central tube; and (i) outlet means for discharging gases from the end of said central tube at the end thereof remote from said fuel burner.

12. A sewage lift station and gas deodorizer comprising:

(a) a tank having an inlet and an outlet for sewage in the lower part thereof and a space for sewer gas above said sewage inlet;

(b) means forming an air inlet adjacent the top of said tank to permit dilution of the sewage gases in said tank to an incombustible level;

(c) means forming a gas exhaust remote from said air inlet and adjacent but above the level of said sewage inlet;

(d) a gas deodorizer having a heating means; and
(e) a blower connecting said gas exhaust means to said deodorizer, whereby atmospheric air flow into said chamber through said inlet is induced and intermixed air and sewer gases may be continuously withdrawn from said tank and passed through said deodorizer for deactivation at a rate sufficiently great to prevent any material quantity of sewer gases being dissolved in liquid within said tank to form a corrosive substance;
(f) said heating means for said deodorizer comprising a gas burner; means for supplying said burner with a gaseous fuel; and means for mixing exhaust gas from said tank with said gaseous fuel to supply primary combustion air for said burner; said gas burner comprising an orifice plate having a central gas orifice therethrough; means forming a heating chamber surrounding and above said orifice plate; and means forming an annular opening surrounding said orifice plate for admitting exhaust gas from said tank into said heating chamber in an annular flow spaced from and surrounding the orifice in said orifice plate.

References Cited

UNITED STATES PATENTS

| | | | |
|---|---|---|---|
| 248,216 | 10/1881 | Reese | 4—221 |
| 913,131 | 2/1909 | Head | 4—221 |
| 939,415 | 11/1909 | Heindel | 158—108 X |
| 1,432,582 | 10/1922 | Will | 23—277 |
| 2,879,862 | 3/1959 | Burden | 110—8 X |

OTHER REFERENCES

Experiences in Odor Control, Sewage Works Journal, September 1941, volume 13, pages 956–968, pages 960–961.

MORRIS O. WOLK, *Primary Examiner.*

MICHAEL E. ROGERS, *Examiner.*